UNITED STATES PATENT OFFICE.

REUBEN G. WHITE, OF HEMPSTEAD, TEXAS.

INSECTIFUGE FERTILIZER FOR COTTON.

968,013.  Specification of Letters Patent.  Patented Aug. 23, 1910.

No Drawing.  Application filed June 22, 1909. Serial No. 503,632.

*To all whom it may concern:*

Be it known that I, REUBEN G. WHITE, a citizen of the United States, residing at Hempstead, in the county of Waller, in the State of Texas, have invented certain new and useful Improvements in Insectifuge Fertilizers for Cotton; and I do hereby declare that the following is a full, clear, and exact description of the invention, which will enable others skilled in the art to which it appertains to make and use the same.

My invention relates to improvements in insectifuge fertilizers for cotton.

It is well known that the two most serious pests with which the cotton producer has to contend are the boll weevil and the cotton worm; that the havoc which these insects have wrought is rapidly extending over the entire cotton belt of this country and all efforts heretofore made by the Government and others to stay the progress of the insects have been unavailing. It is also well known that in case of both the boll weevil and cotton worm the parent beetle or moth stings the squares of the plant, and after feeding more or less upon the same deposits her eggs thereon, which, when hatched, form the larvæ or worms which then bore into the heart of the boll and devour the interior of the seeds, as well as the cotton fibers, thus ruining the latter for textile usage.

The object of my present invention is to provide a comparatively cheap, simple and efficient means for rendering the cotton plant immune from the attack of the above mentioned parasites.

My invention consists of a mechanically united compound, or composition of matter, composed of the following ingredients, combined substantially in the following proportions:

|  | Per cent. |
|---|---|
| Bicarbonate of soda | 15 |
| Nitrate of soda | 15 |
| Sulfate of copper | .25 |
| Crushed or ground decorticated cotton seed | 69.75 |

The above composition when thoroughly mixed or mechanically combined in a dry state forms a fine powder which is used as follows:—It is first drilled, or otherwise inserted into the soil in the hollows upon each side of the cotton plant beds, after which the soil forming the respective beds is transferred to the said adjacent hollows, whereby when the cotton plants begin to grow and develop the composition will be directly beneath and among the roots thereof by which it will be taken up from the soil and incorporated into the constituent elements and parts of the plants, including the cotton boll. I have found from several years' practical experimental tests that when the soil of a cotton field is thus treated with the above described composition the boll weevil and cotton worm do not work upon or injure the cotton plants. I also find that the parent moth or insect will not feed upon such plants or lay her eggs therein for the rearing of her young.

It is believed that the sulfate of copper, which is a well known animal poison, is the active agent or ingredient of the composition which, when absorbed and incorporated into the fiber of the cotton plant, makes the same distasteful and offensive to the said parasites, and thereby renders the plants immune from their attack.

In using the ingredient of sulfate of copper I pulverize it to the last degree of fineness practical in order that it may be most effectually disseminated throughout the compound.

I have found that where my invention is thus used in moderate quantities it increases the yield one hundred per cent. and over. I also find after numerous experimental tests that when the third mentioned ingredient, the sulfate of copper, is omitted from the composition the compound formed of the remaining ingredients forms a very high grade fertilizer of comparatively low cost which greatly promotes and fosters the growth and productiveness of many kinds of grains, vegetables, trees, flowers and other vegetable life.

I have now pending in the Patent Office an application for a patent on the process of rendering the cotton plant immune from the attack of the boll weevil by the application of the above described composition of matter to the soil in which such cotton plants are grown, filed June 22, 1909, Serial Number 503,631.

Having thus described my invention and the manner of employing the same, what I desire to secure by Letters Patent is:

1. The herein described composition of matter consisting of a mixture of bicarbonate of soda, nitrate of soda, sulfate of copper and crushed decorticated cotton seed substantially as described and in the proportions substantially as specified.

2. The herein described composition of matter consisting of a mixture of bicarbonate of soda 15 per cent., nitrate of soda 15 per cent., sulfate of copper one fourth of one per cent. and crushed decorticated cotton seed 69.75 per cent., all substantially as and for the purpose described.

Signed by me at Hempstead, Waller county, Texas, this 18th day of June A. D. 1909.

REUBEN G. WHITE.

Witnesses:
  KEET McDADE,
  WATTS P. DENNY.